(12) United States Patent
Subramaniam et al.

(10) Patent No.: US 6,984,348 B2
(45) Date of Patent: Jan. 10, 2006

(54) PROCESS FOR PREPARING CONDUCTING OR SEMI-CONDUCTING POLYMER WITH HIGH PIEZO-SENSITIVITY

(75) Inventors: Radhakrishnan Subramaniam, Maharashtra (IN); Swamendu Bikas Kar, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 264 days.

(21) Appl. No.: 10/665,348

(22) Filed: Sep. 22, 2003

(65) Prior Publication Data

US 2005/0065280 A1    Mar. 24, 2005

(51) Int. Cl.
*B29B 11/00*    (2006.01)

(52) U.S. Cl. ............................................. 264/6; 264/10
(58) Field of Classification Search ................... 264/5, 264/6, 7, 10, 438; 252/62.9 R, 62.9 PZ
See application file for complete search history.

(56) References Cited

*Primary Examiner*—Evan Pert
(74) *Attorney, Agent, or Firm*—Nixon & Vanderhye P.C.

(57) ABSTRACT

The present invention provides a process for preparation of conducting/semi-conducting polymers having high piezosensitivity, which have a large number of application in electro-mechanical sensors, tactile sensors for robotics, touch sensitive screens and the like. The present invention provides a process for preparation of a conducting/semi-conducting polymer which has very high piezosensitivity and which can be easily made at low temperature and used at low electric fields.

14 Claims, No Drawings

PROCESS FOR PREPARING CONDUCTING OR SEMI-CONDUCTING POLYMER WITH HIGH PIEZO-SENSITIVITY

FIELD OF THE INVENTION

The present invention relates to a process for preparing a conducting or semi-conducting polymer with high piezo-sensitivity. More particularly, the present invention provides a process for preparation of polymeric films with high piezo-resistivity which can be used for electro-mechanical and tactile sensors.

BACKGROUND OF THE INVENTION

Electromechanical sensors and actuators are important for many areas in industry such as vibration sensing and damping, tactile sensors for robotics, touch sensitive screens etc. The conventional materials used for these devices are based on piezoelectric ceramics such barium titanate, lead zirconium titanate etc. These materials have to be processed at high temperatures and are not easy to fabricate in different shapes especially in thin flexible sheets. These ceramics are brittle and cannot be easily mounted on curved surfaces.

There have been some efforts made in the past to synthesize piezoelectric polymers which are mainly based on fluorine containing polymers. Some reports are available in literature (H. S. Nalwa, Ferroelectric Polymers, Marcel Dekker, N.Y., 1995, ch. 3) which indicate that under certain conditions of high orientation and high voltage electric field treatment these fluoro polymers give piezo-electric effect. These types of polymers are not conducting and have many drawbacks for applications in devices such as very high resistivity causing high input impedance, difficult processing techniques, requirements of very high electric fields ($>10^6$ V/m) which cause hazards etc. In order to overcome these drawbacks, semi-conducting polymers can offer a good alternative. However, there is no prior art for the preparation of conducting/semi-conducting polymers having high piezosensitivity.

OBJECTS OF THE INVENTION

The main object of the present invention is to provide a process for preparation of conducting and semi-conducting polymers having high piezo-sensitivity.

SUMMARY OF THE INVENTION

Accordingly, the present invention provides a process for the preparation of a conducting or semi-conducting polymer with high piezosensitivity which comprises, polymerizing a monomer in an aqueous medium containing an initiator and dopant to obtain the conducting/semi-conducting polymer, precipitating the polymer, separating the conducting/semi-conducting polymer in the form of a powder, drying and crushing the polymer powder, adding the conducting/semi-conducting polymer powder to a solution of another polymer in a solvent, mixing the solution thoroughly, casting a film from the solution, holding the film between two metal electrodes and raising the temperature, applying electric potential at a temperature ranging between 40° C. to 100° C. for duration ranging from 10 min to 300 min and at a voltage in the range of 50 V to 100 V, cooling the film to give conducting/semi-conducting polymer having high piezosensitivity.

In one embodiment of the present invention, the monomer used for polymerization is selected from the group consisting of nitrogen or sulfur containing aromatic or heterocyclic compound.

In another embodiment of the invention, the monomer used for polymerization is selected from the group consisting of aniline, anisidine, toluidine, pyrrole, methyl pyrrole, thiophene, methyl thiophene and a substituted derivative thereof.

In another embodiment of the present invention, the initiator and dopant comprises a Lewis acid compound selected from the group consisting of a halide of a transition metal, other acid derivatives containing sulfonic and phosphonic groups.

In another embodiment of the invention, the initiator and dopant comprises ammonium persulphate.

In another embodiment of the present invention, the second polymer used for solution casting has a large dipole moment and dielectric constant in the range of 4.0 to 12.0 and solubility parameter in the range of 9.0 to 12.0.

In another embodiment of the invention, the second polymer comprises polyvinylidiene fluoride.

In yet another embodiment the solvent used for making the solution has high dielectric constant in the range of 20 to 50 and is selected from the group consisting of dimethyl sulfoxide, dimethyl formamide, dimethyl acetamide and any mixture thereof.

In another embodiment the concentration of the conducting/semi-conducting polymer ranges from 3% to 50% preferably 20% by weight of the second polymer.

In another embodiment of the present invention the temperature used for conditioning is in the range of 40° C. to 100° C. preferably 60° C.

In a feature of the present invention the conducting/semi-conducting polymer film is cast in a stainless steel dish at a temperature in the range of 25° C. to 50° C.

In another embodiment of the invention, the doping is carried out using hydrochloric acid when the polymer is synthesized with other oxidizing agents in neutral condition.

DETAILED DESCRIPTION OF THE INVENTION

The present invention provides a process for the preparation of a conducting or semi-conducting polymer with high piezosensitivity. The process comprises polymerizing a monomer such as a nitrogen or sulfur containing aromatic or heterocyclic compound which may be selected from aniline, anisidine, toluidine, pyrrole, methyl pyrrole, thiophene, methyl thiophene and substituted derivatives thereof in an aqueous medium containing an initiator and dopant to obtain a conducting or semi-conducting polymer. The conducting/semi-conducting polymer is then precipitated and the polymer obtained is separated in the form of a powder by any conventional method. The powder so obtained is dried and crushed and then added to a solution of a second polymer in a solvent. This solution is mixed thoroughly and films cast from this solution. The cast films are held between two metal electrodes and the temperature raised while applying electric potential and a voltage. The film is then cooled to provide the conducting or semi-conducting polymer. The temperature of treatment is preferably in the range of 40° C. to 100° C., more preferably 60° C., and the treatment is preferably carried out for a time period in the range of 10 min to 300 min and at a voltage in the range of 50 V to 100 V.

The initiator and dopant comprises a Lewis acid compound selected from the group consisting of a halide of a transition metal, other acid derivatives containing sulfonic and phosphonic groups, such as ammonium persulphate.

The second polymer used for solution casting has a large dipole moment and dielectric constant in the range of 4.0 to 12.0 and solubility parameter in the range of 9.0 to 12.0, such as polyvinylidiene fluoride.

The solvent used for making the solution has high dielectric constant in the range of 20 to 50 and is selected from the group consisting of dimethyl sulfoxide, dimethyl formamide, dimethyl acetamide and any mixture thereof. The concentration of the conducting/semi-conducting polymer preferably ranges from 3% to 50% preferably 20% by weight of the second polymer. The casting itself if carried out preferably in a stainless steel dish at a temperature in the range of 25° C. to 50° C.

In one feature of the invention, the doping is carried out using hydrochloric acid when the polymer is synthesized with other oxidizing agents in neutral condition.

The process of the present invention is described hereinbelow with examples, which are illustrative only and should not be construed to limit the scope of the invention in any manner.

EXAMPLE-1

In a clean beaker containing 440 ml distilled water and 9.2 ml (36%) HCl, pure aniline (8 ml.) was poured and in another glass vessel 19.61 gm. of ammonium persulphate were dissolved in 50 ml distilled water. Both were chilled to 5° C. The ammonium persulphate solution was added dropwise to the aniline solution under vigorous stirring condition. The reaction was allowed to take place up to 3 hr. The precipitate of green particles of polymer was filtered by conventional method using Buckner funnel and Whatmann filter paper and dried. This polymer cake was crushed and ground to fine powder. This was designated as powder I. Polyvinylidiene fluoride (0.2 gm) was dissolved in 30 ml dimethyl acetamide at 50° C. to which were then added 0.02 gm of powder I. The whole mixture was stirred for 24 hrs at R.T to form a uniform conducting polymer blend. This was cast in clean glass petridish by complete solvent evaporation in the 50° C. and then dried under vacuum to give polymer films (30 μm thick). This film was placed between two metal plates, the whole assembly heated to 60 C. and a voltage of 25 V was applied to same for 60 min. The films were removed and tested for piezosensitivity by measuring resistance change with application of external pressure. The results are indicated in Table-1.

EXAMPLE-2

In a clean beaker containing 440 ml distilled water and 9.2 ml (36%) HCl, pure aniline (8 ml.) was poured and in another glass vessel 19.61 gm. of ammonium persulphate were dissolved in 50 ml distilled water. Both were chilled to 5° C. The ammonium persulphate solution was added dropwise to the aniline solution under vigorous stirring condition. The reaction was allowed to take place up to 3 hr. The precipitate of green particles of polymer was filtered by conventional method using Buckner funnel and Whatmann filter paper and dried. This polymer cake was crushed and ground to fine powder. This powder was placed in concentrated hydrochloric acid (2 molar) for 4 hrs, filtered and dried. This was designated as powder II. Polyvinylidene fluoride (0.2 gm. ) was dissolved in 30 ml. dimethyl acetamide at 50° C. to which were then added 0.04 gm of powder II. The whole mixture was stirred for 24 hrs at R.T to form a uniform conducting polymer blend. This was cast in clean glass petridish by complete solvent evaporation in the 50° C. and then dried under vacuum to give polymer films (30 μm thick). This film was placed between two metal plates, the whole assembly heated to 60 C and a voltage of 25 V was applied to same for 60 min. The films were removed and tested for piezosensitivity by measuring resistance change with application of external pressure. The results are indicated in Table-1.

EXAMPLE-3

In a clean beaker containing 440 ml distilled water and 9.2 ml (36%) HCl pure aniline (8 ml.) was poured and in another glass vessel 19.61 gm. of ammonium persulphate were dissolved in 50 ml. distilled water. Both were chilled to 5° C. The ammonium persulphate solution was added dropwise to the aniline solution under vigorous stirring condition. The reaction was allowed to take place up to 3 hr. The precipitate of green particles of polymer was filtered by conventional method using Buckner funnel and Whatmann filter paper and dried. This polymer cake was crushed and ground to fine powder. This polymer powder was then neutralized with 2.0M ammonia solution for 4 hr. It was then washed with distilled water, filtered and dried. 0.005 gm of this neutralized polymer was then placed in the 30 ml of dimethyl acetamide to which were added 0.2 ml dodecyl benzene sulfonic acid (DBSA) and polyvinylidene fluoride (0.2 gm). The whole mixture was stirred for 24 hrs to form a uniform conducting polymer blend. This was cast in clean glass petri-dish by complete solvent evaporation in the 50° C. and then dried under vacuum to give polymer films (30 μm thick). This film was placed between two metal plates, the whole assembly was heated to 50° C. and a voltage of 100 V was applied to same for 60 min. The films were removed and tested for piezosensitivity by measuring resistance change with application of external pressure. The results are indicated in Table-1.

TABLE 1

| Polymer film | Conductivity at no mechanical load (S/cm) | Piezosensitivity factor* |
|---|---|---|
| Example - 1 | $3 \times 10^{-3}$ | 3390 |
| Example - 2 | $2 \times 10^{-2}$ | 63 |
| Example - 3 | $5 \times 10^{-4}$ | 28 |
| Polymer without electric treatment | $2 \times 10^{-2}$ | 7 |
| Bare polymer without blending | $1 \times 10^{-1}$ | <1 |

*Piezosensitivity defined as ratio of electrical conductivity change after application of 500 gm compressive load to the original conductivity without mechanical load It can be seen by comparing the values of oxidation currents given in the above Table-1 that the conducting/semi-conducting polymer film prepared by the process described in the present invention has much higher piezosensitivity than otherwise.

The main advantage of the present invention is that it provides a simple and safe method of preparation of polymer film with high piezosensitivity using low voltages and which gives conducting/semi-conducting polymer which does not require high input impedance. Further, the polymer can be easily made in any shape or size as desired for their applications in electromechanical sensors and similar devices.

Conventional piezoelectric polymer such as polyvinylidene fluoride has many drawbacks in actual use viz. it gives piezoelectric response only when processed in certain conditions, it has to be poled under high electric field in excess of $10^6$ V/m, it has very high electrical resistivity which makes it difficult to connect to conventional electronic circuits. The present invention provides a process for preparation of conducting/semi-conducting polymer which has very high piezosensitivity and which can be easily made at low temperature and used at low electric fields.

We claim:

1. A process for the preparation of a conducting or semi-conducting polymer with high piezosensitivity which comprises, polymerizing a monomer in an aqueous medium containing an initiator and dopant to obtain the conducting/semi-conducting polymer, precipitating the polymer, separating the conducting/semi-conducting polymer in the form of a powder, drying and crushing the polymer powder, adding the conducting/semi-conducting polymer powder to a solution of another polymer in a solvent, mixing the solution thoroughly, casting a film from the solution, holding the film between two metal electrodes and raising the temperature, applying electric potential at a temperature ranging between 40° C. to 100° C. for duration ranging from 10 min to 300 min and at a voltage in the range of 50 V to 100 V, cooling the film to obtain conducting/semi-conducting polymer having high piezosensitivity.

2. A process as claimed in claim 1 wherein the monomer used for polymerization is selected from the group consisting of nitrogen or sulfur containing aromatic or heterocyclic compound.

3. A process as claimed in claim 1 wherein the monomer used for polymerization is selected from the group consisting of aniline, anisidine, toluidine, pyrrole, methyl pyrrole, thiophene, methyl thiophene and a substituted derivative thereof.

4. A process as claimed in claim 1 wherein the initiator and dopant comprises a Lewis acid compound selected from the group consisting of a halide of a transition metal, other acid derivatives containing sulfonic and phosphonic groups.

5. A process as claimed in claim 4 wherein the initiator and dopant comprises ammonium persulphate.

6. A process as claimed in claim 1 wherein the second polymer used for solution casting has a large dipole moment and dielectric constant in the range of 4.0 to 12.0 and solubility parameter in the range of 9.0 to 12.0.

7. A process as claimed in claim 1 wherein the second polymer comprises polyvinylidiene fluoride.

8. A process as claimed in claim 1 wherein the solvent used for making the solution has high dielectric constant in the range of 20 to 50 and is selected from the group consisting of dimethyl sulfoxide, dimethyl formamide, dimethyl acetamide and any mixture thereof.

9. A process as claimed in claim 1 wherein the concentration of the conducting/semi-conducting polymer ranges from 3% to 50%.

10. A process as claimed in claim 1 wherein the time treatment is about 60 minutes.

11. A process as claimed in claim 1 wherein the concentration of the conducting/semi-conducting polymer is 20% by weight of the second polymer.

12. A process as claimed in claim 1 wherein the temperature used for treatment of the polymer mixture is 60° C.

13. A process as claimed in claim 1 wherein the conducting/semi-conducting polymer film is cast in a stainless steel dish at a temperature in the range of 25° C. to 50° C.

14. A process as claimed in claim 1 wherein the doping is carried out using hydrochloric acid when the polymer is synthesized with other oxidizing agents in neutral condition.

* * * * *